(12) United States Patent
Malik et al.

(10) Patent No.: US 7,903,285 B2
(45) Date of Patent: Mar. 8, 2011

(54) ESTIMATING AN AMOUNT OF COLOR IN A DOCUMENT

(75) Inventors: Amal Zaka Malik, Webster, NY (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 547 days.

(21) Appl. No.: 12/025,972

(22) Filed: Feb. 5, 2008

(65) Prior Publication Data
US 2009/0195799 A1   Aug. 6, 2009

(51) Int. Cl.
H04N 1/60 (2006.01)
G06K 15/00 (2006.01)
G03F 3/10 (2006.01)
G03G 21/02 (2006.01)

(52) U.S. Cl. .......... 358/1.9; 358/3.06; 358/2.1; 358/527; 358/540; 358/538; 358/518; 399/79; 399/81

(58) Field of Classification Search ............. 358/1.9, 358/3.06, 1.14, 1.15, 1.13, 2.1, 527, 540, 358/538, 518; 399/79, 8, 81, 24
See application file for complete search history.

(56) References Cited

U.S. PATENT DOCUMENTS

| | | | |
|---|---|---|---|
| 4,890,165 A | 12/1989 | Hasegawa | |
| 6,157,469 A | 12/2000 | Mestha | |
| 6,240,205 B1 | 5/2001 | Fan et al. | |
| 6,377,304 B1 | 4/2002 | Saitoh | |
| 6,493,019 B1 | 12/2002 | Hirasawa | |
| 6,580,525 B1 | 6/2003 | Iwakiri et al. | |
| 2002/0032027 A1 | 3/2002 | Kirani et al. | |
| 2003/0140315 A1 | 7/2003 | Blumberg et al. | |
| 2005/0174591 A1 | 8/2005 | Sowinski et al. | |
| 2008/0079967 A1 | 4/2008 | He | |
| 2009/0109454 A1* | 4/2009 | Nagarajan et al. | 358/1.9 |
| 2009/0195800 A1 | 8/2009 | Malik et al. | |
| 2009/0195801 A1 | 8/2009 | Malik et al. | |

OTHER PUBLICATIONS

Kartheek Chandu and Eli Saber and Wencheng Wu, A Mutual Information Based Automatic Registration and Analysis Algorithm for Defect Identification in Printed Documents, Image Processing 2007-ICIP 2007-IEEE International Conference, Oct. 17, 2007, Rochester Institute of Technology, Rochester, New York.
Non-Final Office Action, U.S. Appl. No. 12/025,991, Jan. 11, 2010.

* cited by examiner

*Primary Examiner* — Charlotte M Baker
(74) *Attorney, Agent, or Firm* — Philip E. Blair; Fleit Gibbons Gutman Bongini & Bianco P.L.

(57) ABSTRACT

What is provided are a novel system, method, and computer program product for estimating the amount of color in a document to be printed, with the capability to handle composite black. A color billing strategy can be dynamically determined based on the amount of color in the document. In one embodiment, a contone CMYK image is examined and the level of color is estimated based on information extracted from the four planes simultaneously. More specifically, it examines the pixel values from all the four planes to calculate the number of white, black, color, and gray or neutral pixel counts. Input CMYK values can be pre-adjusted via a look-up table to take into account neutral balance characteristics. The difference among the adjusted color values is compared against a threshold that is input level dependent. Color is further subdivided into fuzzy colors to handle highlights and neutral areas.

15 Claims, 2 Drawing Sheets

ESTIMATING AN AMOUNT OF COLOR IN A DOCUMENT

TECHNICAL FIELD

The present invention is directed to system and methods for estimating the amount of color in a document.

BACKGROUND

In dynamic print-job environments which process color print jobs for customers, billing is often based on the amount of color content contained in the job to be printed. In order to bill customers for color printing, color detection is a very important feature required in the image path. Color detection is used to analyze print documents for presence as well as amount of color in order to bill customers accordingly.

Some systems rely on user input settings for billing information. This can cause incorrect billing especially in the case of a multi-page document having color on some of the pages but not on others. In these case, the print-job operator would have to physically scan every page of the entire multi-page document in order to properly take into account all the color content contain in the document. This can be time consuming and expensive. This is especially problematic in dynamic print-job environments where print-job processing time and throughput must be maximized in order to maintain profitability.

In some instances, if a large multi-page document contains any color at all, the customer is charged for the whole document as being a color. This can be problematic for the customer if their large multi-page document really only contains very little color content and the price differential between a black/white print-job differs substantially than the price of a color print-job.

Also, billing has traditionally been only a 2-tier billing model. In other words, as long as any single color pixel (C, M, or Y) is turned on, the entire page is billed at the higher rate for reproducing a page of color content. With the need to go with multi-tier color billing, there is a need in this art to examine all 4 color planes (CMYK) quickly and efficiently.

However, all four color planes may not always be synchronized when the image path hardware examines the color content of the document because the pixels from each of the different color planes may not be looked at simultaneously. Depending on the kind, amount, and type of image content contained in a particular color page, the results can vary significantly if inefficient metrics such as the number of color pixels or percentage coverage of color is used instead.

Accordingly, what is needed in this art are increasingly sophisticated applications and advanced methodologies for color management systems which estimate the amount of color in a document.

BRIEF SUMMARY

What is provided are a novel system, method, and computer program product for estimating the amount of color in a document to be printed, with the capability to handle composite black. A color billing strategy can be implemented based on the estimated amount of color.

In one example embodiment, a document is received and the image content contained in the document is examined. The image under examination is clipped around the edges to produce a smaller image to avoid counting false colors on the image border. New values for each CMY pixels may be determined for those cases where the CMY pixel values are close enough so that visually the pixel looks gray, although the CMY pixels are ON. The gray level range is subdivided into n ranges. Each pixel is examined to determine a color for that pixel. A total accumulated pixel count for each color is determined. A billing strategy can then be implemented based on the total accumulated pixel count.

The subject matter disclosed herein will next be described in connection with certain illustrated embodiments. It should be understood that various changes and modifications can be made by those skilled in the art without departing from the spirit or scope of the invention.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided is a novel system and method for estimating the amount of color in a document to be printed, with the capability to handle composite black. A color billing strategy can be implemented based on the estimated color amount.

It should be understood that one of ordinary skill in this art would be readily familiar with many facets of color science such as, but not limited to, color space, imaging, image scaling, color transformation, and other related techniques and algorithms commonly found in the color science arts. Additionally, one of ordinary skill in this art would also be familiar with advanced mathematical techniques for color manipulation and color transformation. One of ordinary skill in this art would also be knowledgeable about computer science and software and programming systems and methods sufficient to implement the functionality and capabilities described in detail herein in their own hardware environments without undue experimentation.

Figure 1:
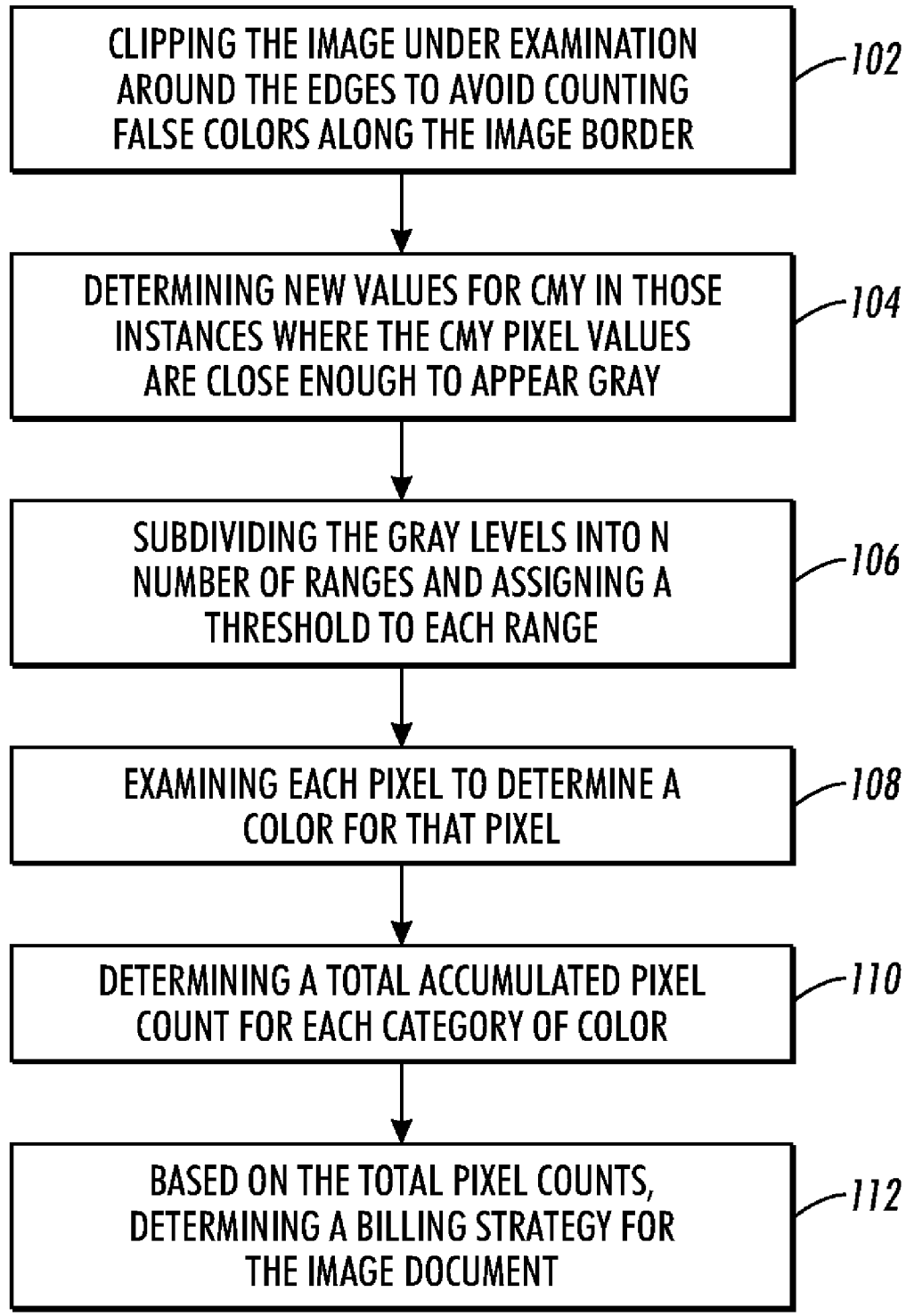
FIG. 1 illustrates a flow diagram of one embodiment of the present method for estimating the amount of color content in a document.

Reference is now being made to FIG. 1 which illustrates a flow diagram of one embodiment of the present method for estimating the amount of color content in a document. By way of example, the present method involves the following.

At step 102, the image under examination is clipped around the edges to produce a smaller image to avoid counting false colors on the image border.

At step 104, new values for each CMY pixels are determined. It should be understood that, for increased efficiency, this step is not needed for each pixel. Instead, this is done only for the cases where the CMY pixel values are close enough so that visually the pixel looks gray, although the CMY pixels are ON. In one embodiment, the new value are determined as follows:

If (C_HIGH is on) then C1=C−LUTC[C] else C1=C.
If (M_HIGH is on) then M1=M−LUTM[M] else M1=M.
If (Y_HIGH is on) then Y1=Y−LUTY[Y] else Y1=Y,
where LUTC, LUTC, LUTY are arrays of 256 entries holding positive or negative respective color offset values less than 256, usually close to 0. It should be understood that C_HIGH, Y_HIGH, M_HIGH are flags indicating that the C, M, or Y pixels are to be adjusted via the LUTC[ ], LUTM[ ], LUTY[ ] tables respectively, depending on whichever of these flags is ON.

Values for max_no, min_no, and ave_no color density for each C, M and Y pixels are calculated, where max_no is the maximum of C,M,Y, min_no is the minimum of C,M,Y, and ave_no is the average of C,M,Y.

At step 106, the gray level range is subdivided into n ranges. In the example embodiment, the ranges are divided as follows: [0, RNG0], [RNG0+1, RNG1], [RNG1+1, RNG2], ..., [RNGn+1, 255]. Each range is assigned its own threshold value: TH1, TH2, ..., THn.

At step 108, each pixel is examined to determine a color for that pixel. In one example embodiment, the determination of a pixel being color is as follows:

If (C, M, and Y pixel values are each ≦WHITE_TH), where WHITE_TH is the threshold for white and is a small number greater than or equal to zero, then,
  If (C=0, M=0, Y=0, K=0) then the current pixel will be counted as a white pixel.
  Else if ((C=0, M=0, Y=0) AND (K>0)) then the current pixel will be counted as a gray pixel.
  Else if (K≦WHITE_TH) then the current pixel will be counted as a white pixel.
  Else if (K<K_BLACK_THR), where BLACK_THR is a threshold for black and is a number less than or equal to 255, but greater than WHITE_TH, then the current pixel will be counted as a gray pixel.
  Else if (K≧K_BLACK_THR) then the current pixel will be counted as a black pixel.
Else, if (C, M, and Y pixel values are each >BLACK_THR) then the current pixel is counted as a black pixel, where BLACK_THR is a programmable value less than or equal to 255, and close to 255.
Else, if ((K+min_no>KMIN_SUM_TH), where KMIN_SUM_TH is the programmable minimum summation threshold value for black, then
  If (K>max_no−KMAX_TH), where KMAX_TH is the programmable maximum threshold value for black, then the current pixel is counted as a black pixel.
  Else if (K>max_no−min_no+K_MIN_MAX_TH), where K_MIN_MAX_TH is the programmable offset for difference between the minimum threshold of black and the maximum threshold for black, then the current pixel is counted as a black pixel.
Else, if (max_no−min_no<=DIFF_TH), where DIFF_TH is a programmable delta threshold, then a new min1, max1 and ave1, based on the previously determined values of C1, M1, and Y1, respectively, are calculated. Based on the value of ave1, a threshold is set, where th=threshold value TH1 to THn depending on which range [0, RNG0], [RNG0+1, RNG1], [RNG1+1, RNG2], ... [RNGn+1, 255], ave1 fell within.
If (max1−min1<th) then the current pixel is either gray or black.
If ((ave1<SHADOW_THR) and (C1, M1, and Y1 are each less than SHADOW_THR2)) where SHADOW_THR is a first programmable threshold for a shadow color and where SHADOW_THR2 is a second programmable threshold for a shadow color, then
  If (max1−min1<th1−FN_TH), where FN_TH is a programmable threshold for fuzzy_neutral, then the current pixel will be counted as a true_neutral pixel.
  Else, if ((max1−min1<th1−FC_TH) AND (max1−min≧th1−FN_TH)), where FC_TH is a programmable threshold for fuzzy_color, then the current pixel will be counted as a fuzzy_neutral pixel.
  Else, if ((max1−min1≧th1−FC_TH) AND (max1−min1<th1)) then the current pixel will be counted as a fuzzy_color pixel.
Else, the current pixel is counted as a true_color pixel.

At step 110, a total accumulated pixel count for each category of color can be determined.

At step 112, a billing strategy can then be determined based on the total accumulated pixel count. The following is an example of one billing strategy. Alternative strategies are envisioned.

Let, color_th be the percentage threshold of the total window size required for a page to be determined to be a color page. Thus: color_th=(perct_th/100)*total_window_size.
  If (total_color_pixels≧color_th), where total_color_pixels=true color pixel count, then the billing is based on a color page.
  Else, if (total_color_pixels<color_th) then the billing is based on the total pixel counts of fuzzy_neutral and/or fuzzy_color pixels.

Various other multi-tiered color billing strategies are envisioned.

As the specific implementation of the end-user hereof will vary depending on hardware and/or software constraints, program code in a particular programming language has been omitted.

It should be understood that the flow diagrams depicted herein are illustrative. Operations may be added, modified, enhanced, condensed, integrated, or consolidated. Variations thereof are envisioned and are intended to fall within the scope of the appended claims.

Figure 2:
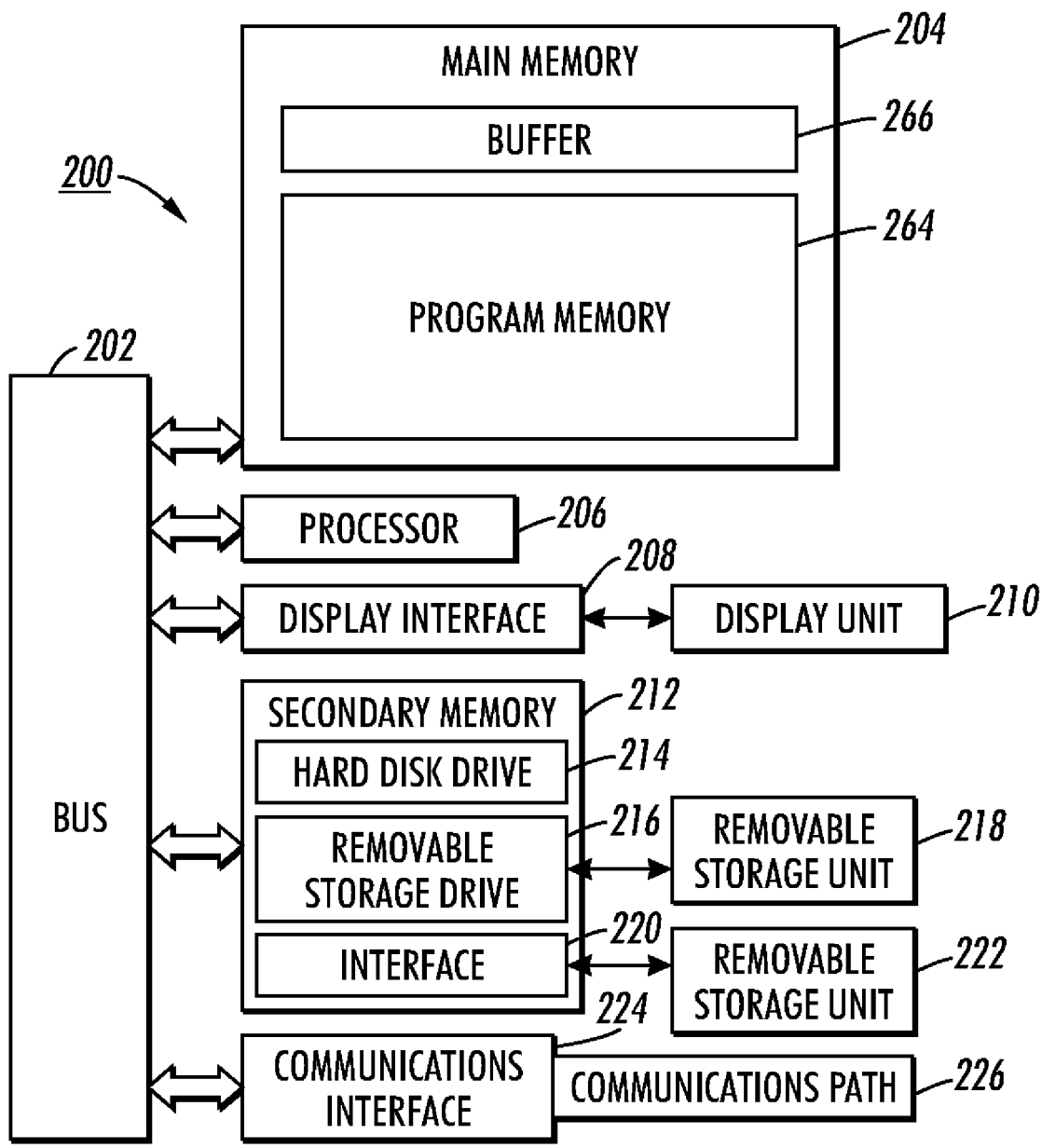
FIG. 2 illustrates a block diagram of a computer system useful for implementing the method illustrated in the flow diagram of FIG. 1.

Reference is now being made to FIG. 2 illustrating a block diagram of a computer system useful for implementing the method illustrated in the flow diagram of FIG. 1. It should be understood that the method described in the flow diagrams provided herewith can also be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

The computer system 200 can be a xerographic system, a photocopier, or printing device. The computer system includes one or more processors, such as processor 206 capable of executing machine executable program instructions. In the embodiment shown, the processor is in communication with bus 202 (e.g., a backplane interface bus, crossover bar, or data network). The computer system also includes a main memory 204 that is used to store machine readable instructions to be executed by the processor. The main memory is capable of storing data used by or produced by the processor. The main memory may alternatively include random access memory (RAM) to support reprogramming and flexible data storage.

In the embodiment shown, main memory includes buffer 266 to temporarily store data for access by the processor, and a program memory 264 that includes, for example, executable programs that implement the methods described herein. The program memory is capable of storing a subset of the data that is less than all of the data contained in the buffer.

Computer system 200 includes a display interface 208 that forwards data from communication bus 202 (or from a frame buffer not shown) to display 210. The computer system also includes a secondary memory 212. The secondary memory may include, for example, a hard disk drive 214 and/or a removable storage drive 216 which reads and writes to removable storage unit 218, such as a floppy disk, magnetic tape, optical disk, etc., that stores computer software and/or data.

In an alternative embodiment, the secondary memory 212 includes other similar mechanisms for allowing computer programs or other instructions to be loaded into the computer system. Such mechanisms may include, for example, a removable storage unit 222 adapted to exchange data through interface 220. Examples of such mechanisms include a program cartridge and cartridge interface (such as that found in video game devices), a removable memory chip (such as an EPROM, or PROM) and associated socket, and other removable storage units and interfaces 220 which allow software and data to be transferred from the removable storage unit to the computer system.

The computer system 200 includes a communications interface 224 which acts as both an input and an output to allow software and data to be transferred between the computer system and external devices. Examples of a communications interface include a modem, a network interface (such as an Ethernet card), a communications port, a PCMCIA slot and card, etc.

Software and data transferred via the communications interface are in the form of signals which may be, for example, electronic, electromagnetic, optical, or other signals capable of being received by communications interface 224. These signals are provided to communications interface via a communications path (i.e., channel) 226 which carries signals and may be implemented using wire, cable, fiber optic, phone line, cellular link, RF, or other communications channels.

Terms such as, computer program medium, computer executable medium, computer usable medium, and computer readable medium, are used herein to generally refer to media such as main memory 204 and secondary memory 212, removable storage drive 216, a hard disk installed in hard disk drive 214, and signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage useful, for example, for transporting information, such as data and computer instructions. Furthermore, the computer readable medium may comprise computer readable information in a transitory state medium such as a network link and/or a network interface, including a wired network or a wireless network, which allows a computer to read such computer readable information. Computer programs (also called computer control logic) may be stored in main memory and/or secondary memory. Computer programs may also be received via a communications interface. Such computer programs, when executed, enable the computer system to perform the features and capabilities provided herein.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

It should also be understood that the teachings hereof can be implemented in hardware or software using any known or later developed systems, structures, devices, and/or software by those of ordinary skill in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. The methods provided herein can also be implemented by physical incorporation into an image processing, image reproduction, or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described herein. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A method for determining a billing strategy for a document based upon an estimated amount of color in that document, the method comprising:
    receiving a contone CMYK image of a document for which a billing strategy is to be determined;
    subdividing the gray level into a total of n gray level ranges;
    examining each pixel of said image to determine a color value for that pixel comprising any of: a color and a gray level, said gray level being assigned based upon the range into which said pixel falls;
    counting a number of pixels in each of said color categories to obtain a total accumulated pixel count for each category of color; and
    determining a billing strategy for said document based upon said total accumulated pixel counts.

2. The method of claim 1, further comprising determining new values for each CMY color in said document in those instances wherein CMY color values are close enough such that a pixel visually looks gray although the CMY are ON.

3. The method of claim 1, further comprising:
calculating a max_no value, a min_no value, and an ave_no color density value for each C,M,Y pixel, where max_no is a maximum for C,M,Y, min_no is a minimum for C,M,Y, and ave_no is an average for C,M,Y; and
using said calculated values to determine said color values for said pixels.

4. The method of claim 1, wherein said billing strategy is based on a percentage threshold of a total window size required for said image to be determined to be color.

5. The method of claim 1, wherein said billing strategy is based on at least one of a total pixel count for a fuzzy neutral color and a total pixel count for a fuzzy color.

6. A system for determining a billing strategy for a document based upon an estimated amount of color in that document, the system comprising:
a storage medium capable of storing data; and
a processor in communication with said storage medium, said processor capable of executing a machine readable instruction for performing the method of:
receiving a contone CMYK image of a document for which a billing strategy is to be determined;
subdividing the gray level into a total of n gray level ranges;
examining each pixel of said image to determine a color value for that pixel comprising any of: a color and a gray level, said gray level being assigned based upon the range into which said pixel falls;
counting a number of pixels in each of said color categories to obtain a total accumulated pixel count for each category of color; and
determining a billing strategy for said document based upon said total accumulated pixel counts.

7. The system of claim 6, wherein said billing strategy is based on a percentage threshold of a total window size required for said image to be determined to be color.

8. The system of claim 6, wherein said billing strategy is based on at least one of a total pixel count for a fuzzy neutral color and a total pixel count for a fuzzy color.

9. The system of claim 6, further comprising determining new values for each CMY color in said document in those instances wherein CMY color values are close enough such that a pixel visually looks gray although the CMY are ON.

10. The system of claim 6, further comprising:
calculating a max_no value, a min_no value, and an ave_no color density value for each C,M,Y pixel, where max_no is a maximum for C,M,Y, min_no is a minimum for C,M,Y, and ave_no is an average for C,M,Y; and
using said calculated values to determine said color values for said pixels.

11. A computer program product for determining a billing strategy for a document based upon an estimated amount of color in that document, the computer program product comprising:
a non-transitory computer readable medium for storing instructions that, when executed on a computer, cause the computer to perform a method comprising:
receiving a contone CMYK image of a document for which a billing strategy is to be determined;
subdividing the gray level into a total of n gray level ranges;
examining each pixel of said image to determine a color value for that pixel comprising any of: a color and a gray level, said gray level being assigned based upon the range into which said pixel falls;
counting a number of pixels in each of said color categories to obtain a total accumulated pixel count for each category of color; and
determining a billing strategy for said document based upon said total accumulated pixel counts.

12. The computer program product of claim 11, further comprising determining new values for each CMY color in said document in those instances wherein CMY color values are close enough such that a pixel visually looks gray although the CMY are ON.

13. The computer program product of claim 11, further comprising:
calculating a max_no value, a min_no value, and an ave_no color density value for each C,M,Y pixel, where max_no is a maximum for C,M,Y, min_no is a minimum for C,M,Y, and ave_no is an average for C,M,Y; and
using said calculated values to determine said color values for said pixels.

14. The computer program product of claim 11, wherein said billing strategy is based on at least one of a total pixel count for a fuzzy neutral color and a total pixel count for a fuzzy color.

15. The computer program product of claim 11, wherein said billing strategy is based on a percentage threshold of a total window size required for said image to be determined to be color.

* * * * *